United States Patent [19]

Hauser

[11] Patent Number: 5,775,238
[45] Date of Patent: Jul. 7, 1998

[54] COOLED GRATE BLOCK

[75] Inventor: Rolf Hauser, Gruningen, Switzerland

[73] Assignee: Von Roll Umwelttechnik AG, Zurich, Switzerland

[21] Appl. No.: 649,325

[22] Filed: May 17, 1996

[30] Foreign Application Priority Data

May 17, 1995 [CH] Switzerland .................... 01447/95

[51] Int. Cl.$^6$ ........................................ F23H 7/08
[52] U.S. Cl. ............................ 110/282; 110/281
[58] Field of Search ........................ 110/278, 281, 110/282, 283, 291, 299

[56] References Cited

U.S. PATENT DOCUMENTS

| | | | |
|---|---|---|---|
| 2,171,848 | 9/1939 | Hofft | 122/374 |
| 4,275,706 | 6/1981 | Pauli | 110/268 |
| 4,463,688 | 8/1984 | Andreoli | 110/281 |
| 4,870,913 | 10/1989 | Schneider | 110/291 |
| 5,042,401 | 8/1991 | Ettehadieh | 110/276 |
| 5,197,397 | 3/1993 | Yamagishi et al. | 110/283 |
| 5,235,921 | 8/1993 | Dunham | 110/282 |
| 5,322,434 | 6/1994 | Milewski et al. | 110/288 |
| 5,617,801 | 4/1997 | Hauser et al. | 110/282 |

FOREIGN PATENT DOCUMENTS

| | | |
|---|---|---|
| 19115 | 3/1929 | Australia ................ 110/182 |
| 498538 | 5/1930 | Germany . |
| 624892 | 1/1936 | Germany . |
| 808263 | 7/1951 | Germany . |
| 93 09 198.2 | 9/1993 | Germany . |
| 44 00 992 C1 | 5/1995 | Germany . |
| 2143932 | 2/1985 | United Kingdom . |

*Primary Examiner*—Henry A. Bennett
*Assistant Examiner*—Gregory A. Wilson
*Attorney, Agent, or Firm*—Oblon, Spivak, McClelland, Maier & Neustadt, P.C.

[57] ABSTRACT

For cooling a grate block which forms a part of a grate for plants for the thermal treatment of waste material, a closed cooling chamber inside a block body of the grate block below an upper wall bearing the waste material is filled with cooling water and is closed in a sealing manner from the bottom by a base provided with an insulation layer. Effective cooling of the parts of the grate block which are subject to the greatest thermal loading takes place, greatly reducing the temperatures. Since thermal expansions in the material are dispensed with, a grate-block row can be formed by only a few grate blocks screwed to one another. The assembly and exchange of grate blocks are simpler; and the undesirable dropping of waste material through the grate between the grate blocks is largely eliminated. Additionally, the grate blocks can be produced from less expensive material.

14 Claims, 1 Drawing Sheet

COOLED GRATE BLOCK

BACKGROUND OF THE INVENTION

1. Field of the Invention

The present invention relates to a cooled grate block which is part of a grate for the thermal treatment of waste material.

2. Discussion of the Background

In conventional waste incineration plants, the waste material is conveyed through a combustion chamber on a grate and, during this process, it is dried and incinerated. In addition to the transporting function, the grate also ensures constant thorough mixing of the waste material so that again and again new surfaces of the waste material are subjected to thermal treatment in the combustion chamber. For this purpose, a grate path has a plurality of grate-block rows arranged one after the other in the manner of steps, stationary and movable grate-block rows respectively following on from one another in alternation. The waste material located on the grate, for example refuse, is moved forward by an advancing movement of the movable grate-block rows and is thoroughly mixed at the same time. A grate-block row is formed in each case by a plurality of grate blocks, generally 16 to 24, which are suspended adjacently on a holding tube and are braced with one another by means of a connecting rod. The individual grate blocks are cooled by means of through-flowing air which, in the case of incineration grates, serves at the same time as an oxidizing agent necessary for the incineration.

Despite the air cooling, the grate blocks are subjected to high thermal loading which results in high thermal tension in the material of the grate blocks. Cracks may form in the material, thus increasing the risk of corrosion. The grate blocks must be produced from high-quality material, for example from high-alloy steel. Owing to the large thermal expansions, the size of the individual grate blocks is limited; a relatively large number of grate blocks are required in one grate-block row. In this case, it is a disadvantage that certain portions of the waste material to be incinerated drop through the gaps between the individual grate blocks, which gaps have occurred due to repeated expansion and shrinkage caused by different block temperatures throughout the course of incineration and start up and shutdown of the furnace. These portions then pass into the slag without having been incinerated. When two or three grate paths are used adjacently, holders for the connecting rods and seals for the escaping air must be arranged not only on the outer side of such a grate, but also between the grate paths. Exchanging individual grate blocks is thus complicated and requires long servicing times.

SUMMARY OF THE INVENTION

An object of the present invention is to reduce the thermal loading of the grate block with the most efficient coolant application, and make possible a construction of a grate which is simpler in terms of assembly and maintenance and also meets all the requirements in terms of operation in an improved manner.

Therefore, the present invention provides for a cooled grate block which is part of a grate for a plant for a thermal treatment of waste material. The cooled grate block comprises an upper wall having an outer surface which forms a useful surface on which waste material to be treated comes to rest, and along which the waste material is transported by means of relative movement of grate blocks disposed downstream of one another. The upper wall, as part of a block body, bounds a cooling chamber with the upper wall being at a top portion of the cooling chamber. The cooling chamber is formed in the block body and is connected to a cooling water system. The cooling chamber is closed in a sealing manner from a bottom by a base provided with an insulation layer.

The advantages achieved by the invention can be seen, in particular, in the effective cooling, as a result of which thermal stresses and thermal expansions in the grate block are largely eliminated. A grate-block row can thus be formed by only a few, wider grate blocks—joined together in a simple manner. As a result, not only are the assembly and exchange simpler, but the portion of waste material dropping through the grate is reduced considerably. At the same time, the grate block can also be produced from less high-quality material.

BRIEF DESCRIPTION OF THE DRAWINGS

In describing the preferred embodiments of the present invention illustrated in the drawings, specified terminology is employed for the sake of clarity. However, the invention is not intended to be limited to the specific terminology so selected and it is to be understood that each specific element includes all technical equivalents which operate for a similar purpose.

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
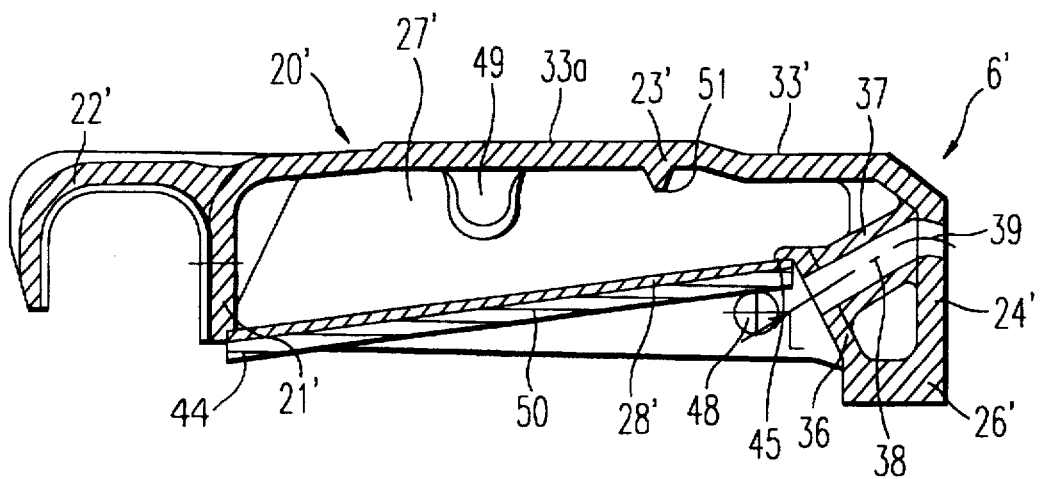
FIG. 1 shows an exemplary embodiment of a grate block in a vertical cross-section.

Referring now to the drawings, wherein like reference numerals designate identical or corresponding parts throughout the several views, FIG. 1 illustrates, in a vertical cross-section, a grate block 6' as part of a grate for a plant for the thermal treatment of waste material. In a manner which is known per se and which is not illustrated in greater detail in the drawing, a plurality of grate blocks 6' are arranged adjacently in each case in a grate-block row and are joined to one another as well as to two side plates. A plurality of grate-block rows arranged in the manner of steps then form a grate element, a stationary grate-block row and a movable grate-block row following on from one another in alternation. A grate path, likewise not illustrated in the drawing, is then composed of a plurality of grate elements; generally, three to five grate elements are arranged one after the other. Additionally, a plurality of grate paths can be arranged adjacently; one to four grate paths usually form the width of the grate. The number of grate elements and of grate paths depends on the throughput quantity of the waste material specified and on its calorific value.

Figure 2:
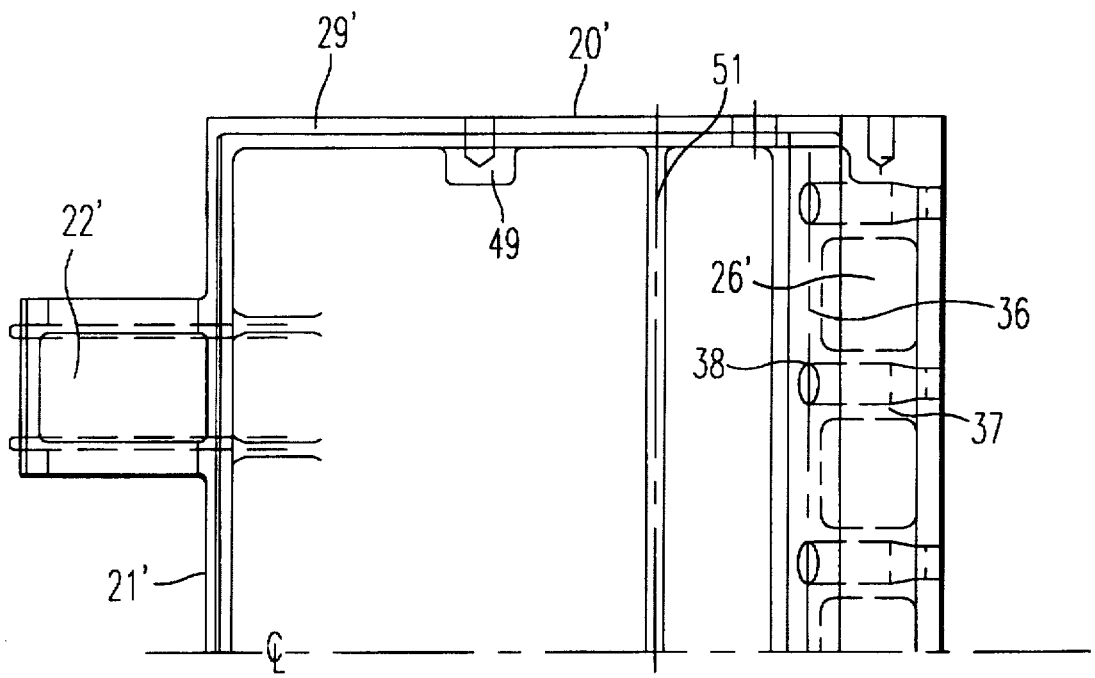
FIG. 2 shows a part of a block body as seen from below.

According to FIGS. 1 and 2, a block body 20' of the grate block 6' is illustrated. The block body 20' is preferably produced as a casting, and has a substantially U-shaped cross-section with an upper wall denoted by 23', a rear wall by 21', and a front wall by 24'. The rear wall 21' is fitted with at least two hooks 22' which are distributed over the width of the grate block 6' and by means of which the grate block 6' is suspended on a block holding tube (not illustrated)

(only one of the two hooks 22' can be seen in FIG. 2). The front wall 24' has a foot 26' at the bottom. The foot 26' of a grate block 6' is respectively assigned to a central part 33a of an outer surface 33' of the upper wall 23' of a subsequent grate block 6'; they are respectively displaceable relative to one another. The outer surface 33' of the upper wall 23' forms a useful surface on which the waste material to be treated comes to rest, and along which it is transported by means of the relative advancing movement of the movable and the fixed grate-block rows. On the inner side, the upper wall 23' is provided with a reinforcement 51 against bending, which reinforcement extends over the width of the grate block.

The block body 20' is furthermore fitted with a wall 36 which adjoins the foot 26', is directed, if appropriate, obliquely into the block interior, and is joined to the front wall 24' by means of a plurality of nozzles 37 which are distributed evenly over the width of the grate block 6'. The obliquely arranged nozzles 37 are provided with openings 38 which have an angled outlet part 39 in the region of the front wall 24'. Air, for example, as an oxidizing agent necessary for the incineration is fed through the openings 38 from below in the direction of an arrow L (FIG. 1) to the waste material to be incinerated.

The block body 20' has two side walls 29' which are each fitted with a screw hole 48, by means of which the grate blocks 6' are preferably screwed to one another. Additionally, the side walls 29' are fitted with lugs 49 by means of which the grate blocks 6' can be joined, for example screwed, to the side plates already mentioned, but not illustrated in the drawing. In each case, the outermost grate blocks 6' of each fixed grate-block row are screwed to the side plates.

The rear wall 21' is provided with a shoulder surface 44 at the bottom; a shoulder surface 45 is also formed at the upper region of the oblique wall 36. A base 28' (for example formed from sheet metal) provided with an insulation layer 50 is attached in a sealing manner, if appropriate welded in, to the shoulder surfaces 44, 45.

A cooling chamber 27' is thus formed inside the block body 20' and is kept closed by the base 28' which is connected by means of cold water feed lines and hot water drainage lines, not illustrated in the drawing, to a cold water low-pressure system or to a closed cooling water system with an incorporated heat exchanger. The arrangement of appropriate water lines in the cooling chamber is treated in detail in Swiss Patent Application No. 3452/94; A 10599.

In the water cooling of individual grate blocks 6' according to the invention, by virtue of the more favorable heat transmission coefficients of water compared to air, the mean temperature values at the grate can be reduced considerably. If these values were, for example, between 350° C. and 700° C. for air cooling, they could be reduced to about 500° to 100° C. by means of the water cooling. The high thermally caused stresses and expansions in the material which were usual in air-cooled grate blocks 6' are dispensed with in the case of water cooling according to the invention. As a result, in contrast to earlier grate designs, fewer (three to four), wider grate blocks 6' can be arranged adjacently in a grate-block row without difficulty and form the width of the grate path. The previous bracing by means of connecting rods is likewise dispensed with; the grate blocks 6' of a grate-block row can be screwed to one another in a simple manner. In the case of multipath grates, the previously necessary holders for the connecting rods between the individual paths are thus also dispensed with. As a result, any required exchange of grate blocks 6' is considerably simplified and requires shorter servicing times. In addition, in the case of the earlier high temperatures, such an exchange was required more frequently, for example every year. A substantial advantage lies, according to the invention, also in the fact that, by the use of few grate blocks 6' or by the omission of gaps, the portion of waste material dropping through the grate is considerably reduced; and the risk of non-ferrous heavy metals, for example, or dust dropping through the grate and passing into the slag without having been incinerated is significantly lower.

By means of the lower temperatures and the lower thermal loading of the grate block 6', the risk is largely also eliminated that cracks enhancing corrosion will occur in the material due to thermal stresses. The use of less high-quality material for the grate blocks 6' can thus be taken into consideration.

By means of the arrangement of an insulation layer 50 on the outside of the base 28' closing off the cooling chamber 27' at the bottom, according to the invention the thermal stresses in the base 28', otherwise caused by the temperature difference between the temperatures prevailing on the one hand in the cooling chamber 27' and on the other hand below the grate, are additionally avoided. As a result, the service life of the entire grate block 6' can be increased.

Additionally, the cooling capacity is not given off unnecessarily for cooling the lower grate-block base which is not in direct contact with the waste material being incinerated, but nevertheless has relatively high temperatures, but is used for the most part for cooling the upper and front part of the grate block 6' or the block body 20' which is subject to the greatest thermal loading. This measure is particularly advantageous when, for a specific reason (for example for waste material having a lower calorific value), preheated air is fed to the waste material from below through the openings 38. The increase in the turnover of the quantity of cooling water and the ensuing increase in the cooling capacity which normally follow in such a case can be dispensed with according to the invention.

Without the cooling system being modified accordingly or the throughput of coolants being increased, the entire requirement for coolants for grate-block cooling can be reduced by means of a simple constructive measure which is, however, quite unusual in the grate construction for incineration plants, namely by applying an insulation layer to a part of the grate block 6'.

In the preferred exemplary embodiment of the grate block 6' illustrated, the insulation layer 50 is applied to the outside of the base 28'. In this case, it can, for example, be a layer of mineral wool, preferably about 20 mm thick, which is joined to the base 28' by bonding or by mechanical attachment means (screws, rivets, etc.). However, it would also be conceivable to apply a non-corroding insulation layer to the inner side of the base 28' and thus to exclude the base 28' completely from the cooling system; however, in such a case, the thermal expansions in the base 28' depending on the temperatures below the grate would have to be taken into account.

Apart from bonded or mechanically attached insulation layers, sprayed-on heat insulating layers could also be taken into consideration.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A cooled grate block which is part of a grate for a plant for a thermal treatment of waste material, the cooled grate block comprising:

an upper wall having an outer surface which forms a useful surface on which waste material to be treated comes to rest, and along which the waste material is transported by means of relative movement of grate blocks disposed downstream of one another, wherein the upper wall, as part of a block body, bounds a cooling chamber with the upper wall being at a top portion of the cooling chamber, the cooling chamber being formed in the block body and being connected to a cooling water system, the cooling chamber being closed in a sealing manner from a bottom by a base provided with an insulation layer.

2. A cooled grate block according to claim 1, wherein the block body has a foot which adjoins a front wall of the block body and is joined at a rear to a wall directed into an interior of the block body, the base being attached to a shoulder surface of a rear wall of the block body and to a further shoulder surface of the wall directed into the interior of the block body.

3. A cooled grate block according to claim 2, wherein the wall directed into the interior of the block body is joined to the front wall by means of a plurality of nozzles distributed evenly along a width of the grate block and passing through the cooling chamber, the wall directed into the interior of the block body, the front wall and the nozzles being provided with continuous openings.

4. A cooled grate block according to claim 1, wherein the insulation layer is applied to an outer side of the base.

5. A cooled grate block according to claim 1, wherein the insulation layer extends over an entire surface of the base attached to the integral block body.

6. A cooled grate block according to claim 4, wherein the insulation layer is formed by a layer of mineral wool.

7. A cooled grate block according to claim 5, wherein the insulation layer is formed by a layer of mineral wool.

8. A cooled grate block according to claim 6, wherein the insulation layer has a thickness of about 15 to 25 mm.

9. A cooled grate block according to claim 7, wherein the insulation layer has a thickness of about 15 to 25 mm.

10. A cooled grate block according to claim 6, wherein the insulation layer is bonded to the base.

11. A cooled grate block according to claim 7, wherein the insulation layer is bonded to the base.

12. A cooled grate block according to claim 6, wherein the insulation layer is mechanically attached to the base.

13. A cooled grate block according to claim 7, wherein the insulation layer is mechanically attached to the base.

14. A cooled grate block according to claim 1, wherein the insulation layer is formed by a heat insulating layer sprayed onto the base.

* * * * *